US007703600B1

(12) United States Patent
Price

(10) Patent No.: US 7,703,600 B1
(45) Date of Patent: Apr. 27, 2010

(54) TRANSPORT BELT WITH LINK CARCASS

(76) Inventor: John G. Price, 2733 Gunter Park Dr. West, Montgomery, AL (US) 36109

( * ) Notice: Subject to any disclaimer, the term of this patent is extended or adjusted under 35 U.S.C. 154(b) by 0 days.

(21) Appl. No.: 12/379,203

(22) Filed: Feb. 17, 2009

(51) Int. Cl.
 *B65G 15/34* (2006.01)
(52) U.S. Cl. .................. 198/847; 198/844.1; 198/844.2
(58) Field of Classification Search ............. 198/844.1, 198/844.2, 847, 848
 See application file for complete search history.

(56) References Cited

U.S. PATENT DOCUMENTS

| 420,779 | A | | 2/1890 | Emery | |
|---|---|---|---|---|---|
| 652,447 | A | * | 6/1900 | Swenson | 198/847 |
| 660,027 | A | * | 10/1900 | Proctor | 198/847 |
| 757,919 | A | | 4/1904 | Harley | |
| 829,579 | A | * | 8/1906 | Folsom | 198/847 |
| 1,204,816 | A | | 11/1916 | Pattee | |
| 1,360,456 | A | | 11/1920 | Shiner | |
| 1,527,912 | A | | 2/1925 | Paul | |
| 2,211,607 | A | * | 8/1940 | Reimel | 198/847 |
| 2,646,161 | A | * | 7/1953 | Lorig | 198/847 |
| 2,766,159 | A | * | 10/1956 | Adams, Jr. et al. | 198/847 |
| 2,851,152 | A | * | 9/1958 | Olsson | 198/847 |
| 2,903,123 | A | * | 9/1959 | Naylor | 198/847 |
| 2,983,636 | A | * | 5/1961 | Runton | 198/847 |
| 3,275,123 | A | * | 9/1966 | Prosser et al. | 198/847 |
| 3,291,288 | A | * | 12/1966 | Haustovich | 198/699.1 |
| 3,545,598 | A | * | 12/1970 | McGinnis | 198/825 |
| 3,574,022 | A | * | 4/1971 | Lampert | 156/88 |
| 3,724,645 | A | * | 4/1973 | Spaar | 198/847 |
| 4,004,467 | A | * | 1/1977 | Kenney | 198/321 |
| 4,184,589 | A | * | 1/1980 | Habegger | 198/847 |
| 4,650,068 | A | * | 3/1987 | Vanassche et al. | 198/847 |
| 4,855,174 | A | * | 8/1989 | Kawamoto | 428/67 |
| 4,928,812 | A | * | 5/1990 | van Calker et al. | 198/847 |
| 5,004,098 | A | * | 4/1991 | Marshall | 198/847 |
| 5,141,101 | A | * | 8/1992 | Vance et al. | 198/847 |
| 5,164,241 | A | * | 11/1992 | Andre De La Porte et al. | 428/97 |
| 5,422,165 | A | * | 6/1995 | Arnold | 428/192 |
| 6,029,801 | A | * | 2/2000 | Odin et al. | 198/847 |
| 6,427,728 | B1 | * | 8/2002 | Maguire et al. | 139/383 A |
| 6,540,069 | B2 | * | 4/2003 | Tschantz | 198/844.1 |
| 6,666,326 | B2 | * | 12/2003 | Hymes et al. | 198/846 |
| 6,749,708 | B2 | * | 6/2004 | Allen et al. | 156/124 |
| 6,837,366 | B2 | * | 1/2005 | Nishikita | 198/847 |
| 7,267,219 | B2 | * | 9/2007 | Vogt | 198/847 |
| 7,464,809 | B2 | * | 12/2008 | Nozaki et al. | 198/847 |

* cited by examiner

Primary Examiner—Douglas A Hess
(74) Attorney, Agent, or Firm—Robert L. Haines

(57) ABSTRACT

The present invention provides a transport or conveyor belt structure, particularly for use in heavy duty environments such as mining, aggregate and ore handling and other industrial conditions, where the belt preferably comprises a carcass that is made from identical cross-shaped interengaging metal links embedded within the body of the belt so as to provide both strength and flexibility. A method of making such a belt comprising building up layers of belt material and links is also described as are unique structures for joining and splicing belt ends or sections.

18 Claims, 8 Drawing Sheets

TRANSPORT BELT WITH LINK CARCASS

FIELD OF INVENTION

The present invention relates to transport and conveyor belts in general and particularly to belts used in heavy duty environments such as mining, aggregate and ore handling and other industrial conditions.

The transport belt of the present invention provides a carcass that is made from identical cross-shaped metal links which interengage so as to provide both strength and flexibility within the body of the belt while also permitting splices and repairs to be accomplished in the field.

BACKGROUND OF INVENTION

This invention relates to conveyor belts for carrying bulk material and in particular conveyor belts which are supported on conventional troughing rolls. Such belts are required to be strong and almost inextensible in the longitudinal direction and to have a moderate stiffness transversely, so that the longitudinal driving loads will be sustained and the belts will bend into the desired trough shape while bridging the angles between the several troughing rolls in each group.

A great many combinations of reinforcing materials have been proposed to impart the desired properties to conveyor belts of rubber or other elastomers for carrying bulk materials, but the majority of such belts continue to be reinforced with multiple plies of woven fabrics, or a multi-ply woven fabric having a plurality of layers of longitudinal yarns, or, alternatively, uniformly spaced longitudinal cords or cables combined with a transverse stiffener. Such belts, when carefully made, track satisfactorily over the head and tail pulleys and the intervening idler rolls, but require closely spaced expensive troughing rolls to provide adequate support and to prevent spillage. One of the main factors leading to spillage seems to be the flattening of the belt between idlers brought about by the high tension required to drive such belts and the inherent flexibility of woven fabrics, cords or cables embedded within the rubber or elastomer forming the body of the belt.

Attempts have been made to control spillage by adding upstanding rubber flanges to the edges of belts which are otherwise of conventional construction, but such flanges not only do not prevent transverse flattening between successive troughing idlers, but present other problems such as difficulties in passing around end pulleys, particularly if the flanges are high enough to be of significant benefit in preventing spillage.

In addition, proposals have been made to provide supports for conveyor belts omitting longitudinal reinforcements over a part or all of their width. Thus, so-called "cable belts," made without longitudinal tension members, ride on a pair of moving steel cables, which permits elimination of inclined troughing rolls but requires addition of separate sheaves for guiding and transmitting power to the cables. Other proposals are to omit some of the longitudinal reinforcement at a particular zone, such as an edge or the center of the belt, but the remaining reinforcement in such cases is of a conventional kind and located in a conventional relation to the transverse reinforcement.

Belts having metal cores or carcasses have been proposed in the past. However, such belts do not provide the desired longitudinal and lateral strength and flexibility of the present invention.

For example, one of the earliest examples, Emery, U.S. Pat. No. 420,779, provides two layers of an ordinary leather belt with parallel metal strips arranged in the longitudinal direction and cemented between the layers. No lateral connection between the strips is evident.

Similarly Harley, U.S. Pat. No. 757,919, provides a longitudinal metal band between two layers of belt material with the edges of the belt material stitched to enclose the band. When a wide belt is constructed, a plurality of bands are provided and the belt material stitched between the bands. As with Emery, there is no lateral connection providing no lateral stiffness to the belt.

Pattee, U.S. Pat. No. 1,204,816, discloses a belt which is constructed of a plurality of interwound spiral coils disposed parallel to each other in a lateral arrangement across the belt. The coils are secured to endless flexible cables disposed along the longitudinal edges of the belt. When the belt body is made of rubber it fills the interstices of the coils embedding them within the rubber body.

Shiner, U.S. Pat. No. 1,360,456, discloses a reinforced belt where the reinforcing element is a link chain of the type consisting of U-shaped links with the arms of each link being apertured to receive the bend of the adjacent link. The chains are embedded within the belt material in parallel rows along the longitudinal axis of the belt.

Paul, U.S. Pat. No. 1,527,912, discloses a belt core consisting of a strip of metal provided with a plurality of pairs of slits with the metal between the slits being pressed outwardly in opposite directions to form transversely extending circular openings.

SUMMARY OF THE INVENTION

In accordance with this invention, a carcass is provided for conveyor belts which provides the required longitudinal and lateral reinforcement and stiffness while retaining sufficient flexibility to permit the belt to trough and to bend. Specifically, the belts of this invention have a carcass comprising a plurality of metal link members embedded within the belt material in an arrangement which results in a dual layer chain-like structure extending through the length and width of the belt. The link members are separated by the belt material in the three dimensions of longitudinal, lateral and vertical which permits the belt to bend over end pulleys while the link members themselves prevent undue stretching of the belt.

These belts are easily manufactured, from materials which are readily available and inexpensive and by common layered belt manufacturing means such as adhesive joining or vulcanization. In addition, the metal of the link members and their design provide edge reinforcement along the belt without the need for additional longitudinal reinforcements or wear resisting covers required by other belts but do not restrict the use of such other reinforcements or covers.

The present invention also provides a unique structure for joining belt ends and splicing sections of the belt together permitting a long belt to be assembled from shorter sections while maintaining the strength and flexibility of the belt structure. This facilitates repair of the belt in the field with reduced down time for the user.

It is therefore an object of this invention to provide a transport or conveyor belt comprising a plurality of plies of flexible material adhered together and having an interposed carcass comprising a plurality of interengaging links embedded within said flexible material wherein the links each comprise a substantially planar, cross shaped member having a central body and two pairs of opposing arms where the links are disposed across the flexible material in an alternating and partially overlapping arrangement.

It is a further object of this invention to provide a transport or conveyor belt of the above character where the ends of the arms are bent so as to be disposed perpendicular to the plane of the central body and where adjacent links are inverted relative to each other and disposed in lateral and longitudinal rows across and along the belting and embedded therein, whereby the ends of the arms of one link extend in a direction opposite to the ends of the arms of adjacent links and the ends of the arms of adjacent links overlap such that the ends of the arms of one link are disposed laterally toward the centers of the adjacent links providing a space between the ends of adjacent interengaging links such that a plug of the belt material is disposed between those adjacent ends.

It is a still further object of the present invention to provide a transport or conveyor belt comprising a first rubber layer having an upper surface and a lower surface, a second rubber layer having an upper surface and a lower surface, a third rubber layer having an upper surface and a lower surface where the third rubber layer is disposed between the upper surface of the first rubber layer and the lower surface of the second rubber layer, and a plurality of link members each comprising a substantially planar cross-shaped member having a central body and two pairs of opposing arms, the ends of the arms being bent so as to be substantially perpendicular to the plane of the central body for a length corresponding substantially to the thickness of the third rubber layer.

In this construction a first layer of the link members is disposed in rows and columns on the upper surface of the first rubber layer with the ends pointing upward away from the first rubber layer, adjacent link members being spaced apart a distance less than the distance spanned by opposing arms of the link members. The third rubber layer is disposed over the first layer of the link members whereby the ends of the link members pierce the third rubber layer and the lower surface of the third rubber layer contacts the upper surface of the first rubber layer between the link members. A second layer of the link members is disposed in rows and columns on the upper surface of the third rubber layer with the ends pointing downward toward the first rubber layer, adjacent link members of the second layer being spaced apart a distance less than the distance spanned by opposing arms of the link members and the link members of the second layer being disposed over the spaces between the link members of the first layer whereby the ends of the link members of the second layer pierce the third rubber layer so as to be located parallel to and inward of the ends of the first layer of the link members such that the third rubber layer is confined between the first layer of the link members and the second layer of the link members as well as between parallel pairs of ends of the first and second layers of the link members. The second rubber layer is disposed over the third rubber layer and the second layer of link members whereby the lower surface of the second rubber layer contacts the second layer of the link member and the upper surface of the third rubber layer between the link members and the first, second and third rubber layers are adhered together forming a unitized belt body with the interengaging link members confined therein.

It is an even further object of the present invention to provide a transport or conveyor belt of the above character having a splice means comprising a plurality of snap links and a hinge member cooperating therewith wherein the snap links comprise a plate portion adapted to overlie an exposed arm of the link members and a box portion adapted to cooperate with the perpendicular ends of the exposed arms, the box portion comprising at least one wall perpendicular to the plate portion and having an aperture therein to receive a hinge member, such as a rod or cable, and where the snap links are positioned in cooperating exposed arrangement at the ends of the belt.

It is an even further object of the present invention to provide a transport or conveyor belt of the above character comprising free ends of the belt having arms and perpendicular ends of the link members exposed and a plurality of snap links cooperating with the exposed perpendicular ends, the snap links comprising a plate portion adapted to overlie the exposed arm of the exposed perpendicular ends and a box portion disposed adjacent the exposed perpendicular ends, the box portion comprising an end wall disposed against the perpendicular end and a side wall at right angles to the perpendicular end, the side wall having an aperture therein to receive a securing means, whereby interengaging exposed perpendicular ends and placing the snap links over the interengaged free ends of the belt brings the apertures into alignment on either side of a channel formed between the interengaged perpendicular ends whereby passage of a securing means therethrough secures the free ends of the belt together in the manner of a hinge.

Further objects and advantages will be evident from the following drawings and description.

DETAILED DESCRIPTION OF THE INVENTION

Figure 1:
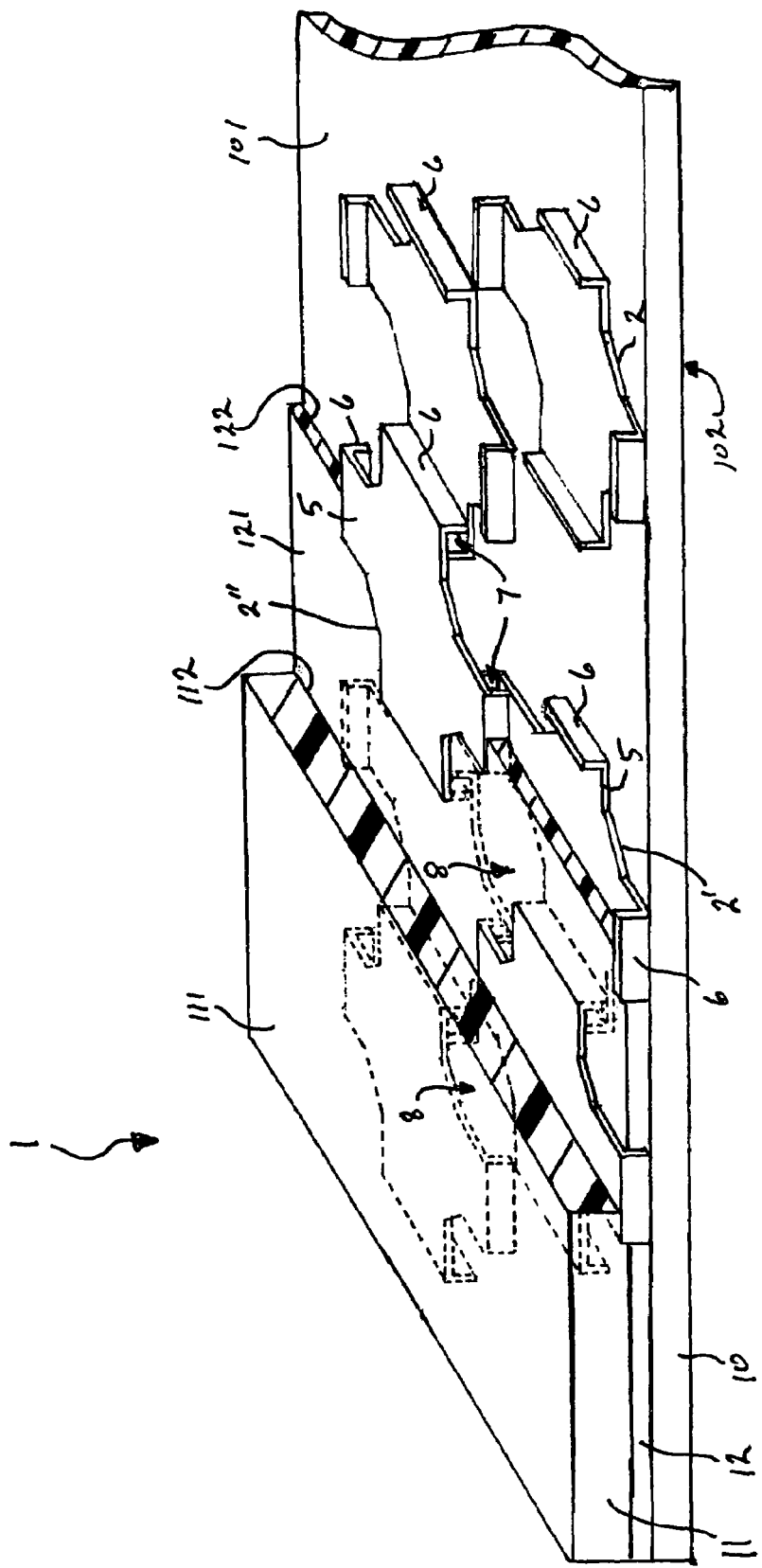
FIG. 1 is a partial cutaway view of a belt according to the present invention.
Figure 2:
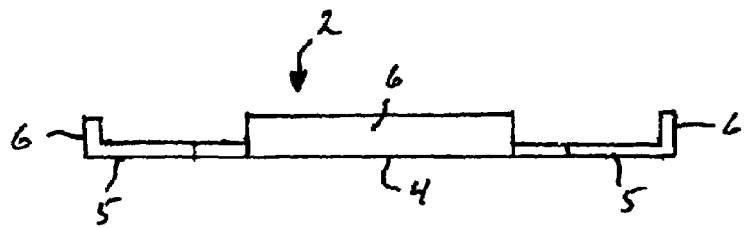
FIG. 2 is a side view of a link member of the belt of the present invention.
Figure 3:
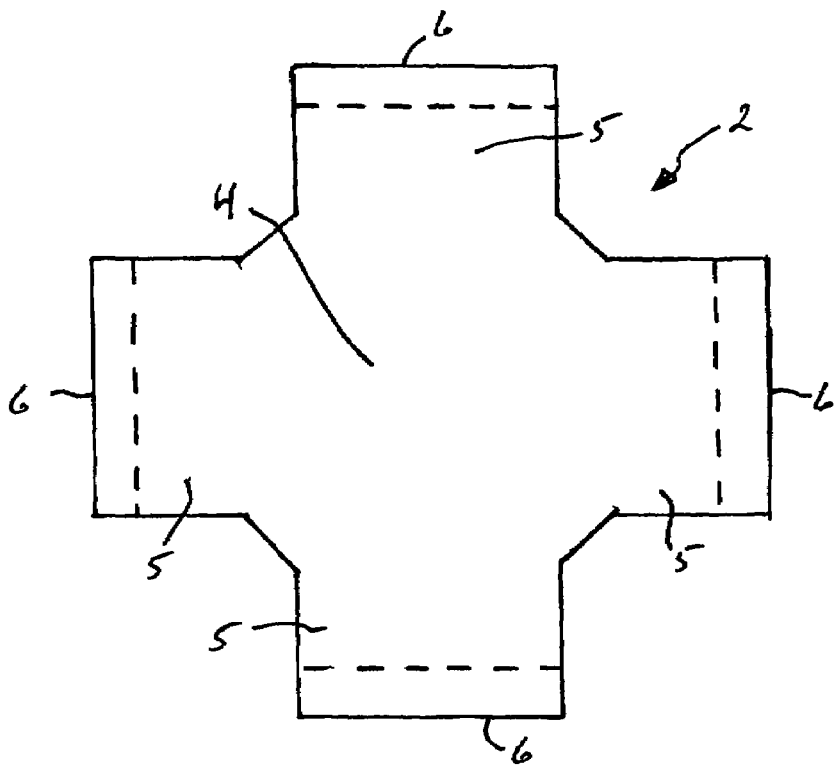
FIG. 3 is a bottom view of a link member of the belt of the present invention.
Figure 4:
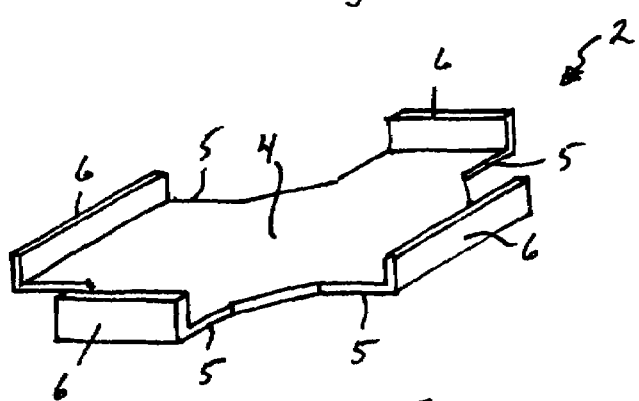
FIG. 4 is an oblique view of a link member of the belt of the present invention.
Figure 5:
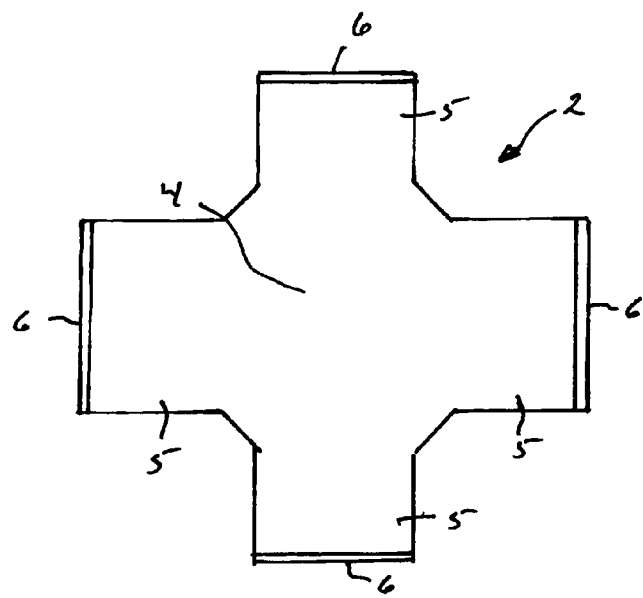
FIG. 5 is a top view of a link member of the belt of the present invention.

Referring to FIG. 1, which shows a section of the transport belt of the present invention, a plurality of plies 1 of flexible belt material of the desired length and width are adhered together with the link members 2 making up the carcass 3 embedded therein. The belt material may be any material that is suitable for the manufacture of conveyor or transport belts and which is capable of adhering to the material from which the link members 2 are fabricated. Such belt materials include, but are not limited to, various natural or synthetic rubber and elastomeric compounds commonly used in belt construction, such as chlorobutyl, nitrile and styrene butadiene rubber and blends. The link members 2 are preferably fabricated from metals suitable to the particular usage for the belt including, but not limited to, carbon steel, stainless steel, brass, bronze, aluminum, titanium, or the like, as well as alloys. In addition, where suitable, the carcass links 2 may be made from rigid or semi-rigid reinforced or non-reinforced polymer materials, such as glass or carbon fiber epoxy laminates.

In a preferred embodiment, the belt comprises a carcass 3 comprising a plurality of link members 2 embedded within the plies 1 of belt material in an arrangement which results in a dual layer chain-like structure extending through the length and width of the belt. The link members 2 are separated by the belt material in the three dimensions of longitudinal, lateral and vertical which permits the belt to bend over end pulleys while the link members themselves prevent undue stretching of the belt.

Figure 6:
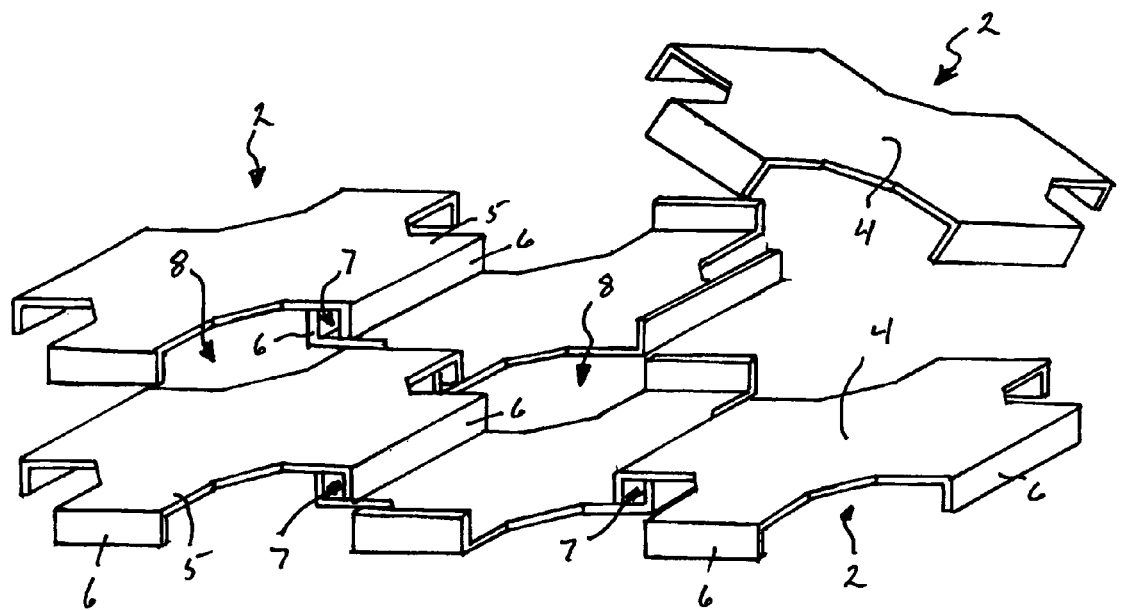
FIG. 6 illustrates the alternating arrangement of link members.

As shown in FIGS. 2-5, the basic link member 2 forming the carcass 3 comprises a substantially planar, cross shaped member having a central body 4 and two pairs of opposing arms 5. The ends 6 of the arms 5 are bent so as to be disposed perpendicular to the plane of the central body 4 so that when adjacent link members 2 are inverted relative to each other and disposed in lateral and longitudinal rows across and along the belting and embedded therein, the ends 6 of the arms 5 of one link member 2 extend in a direction opposite to the ends 6 of the arms 5 of adjacent link members and the ends 6 of the arms 5 of adjacent link members 2 overlap such that the ends of the arms 6 of one link member 2 are disposed laterally toward the centers of the central body 4 of adjacent link members 2 providing a space 7 between the ends of adjacent interengaging link members 2 as shown in FIG. 6. When the belt is formed as shown in FIG. 1, the space 7 between the ends 6 of adjacent interengaging link members 2 permits a plug of the belt material to become disposed in the space 7 between those adjacent ends.

Figure 7:
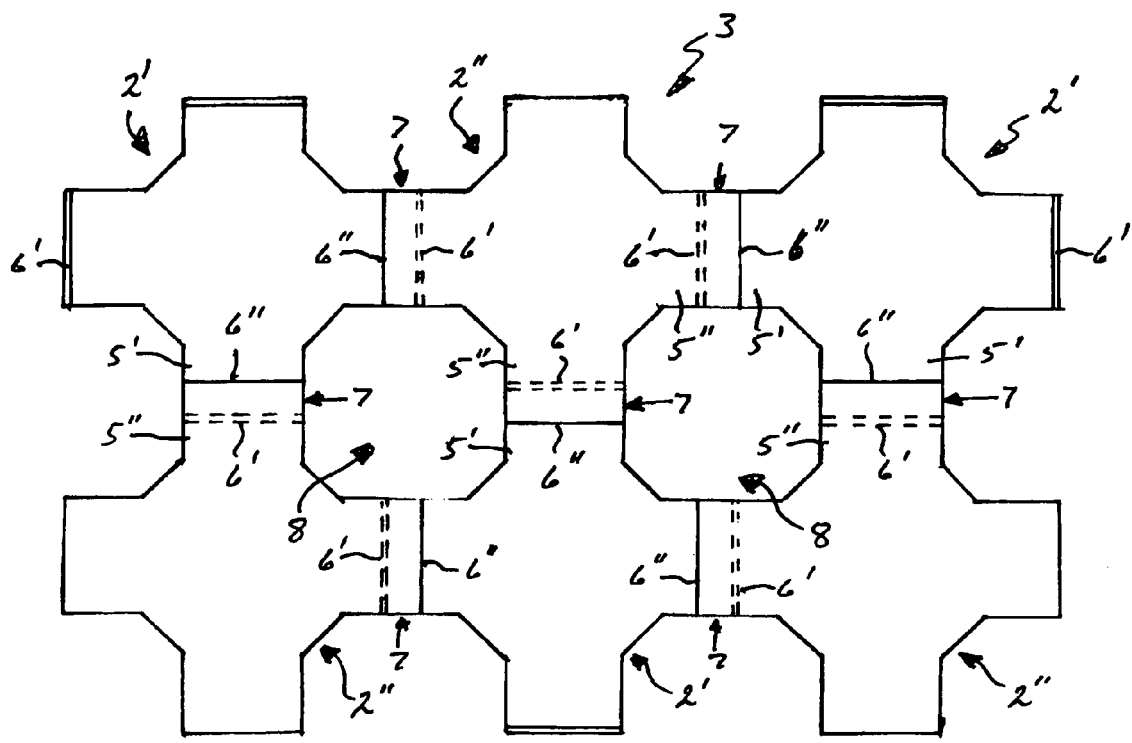
FIG. 7 is a top view of an arrangement of link members.

FIG. 7 shows a section of carcass 3 comprising interengaging upward facing link members 2' and downward facing link members 2". As will be evident, each upward facing link member 2' interengages with a downward facing link member 2" with the downward facing link members 2" being supported by the ends 6' of the upward facing link members 2'. Also, the overlap of the arms 5' and 5" of the upward facing and downward facing link members 2' and 2" produces the space 7 between the arms 5' and 5" and the ends 6' and 6" of the respective link members 2' and 2".

As is also evident from FIGS. 1, 6 and 7, the spacing of the adjacent link members 2 results in an open space 8 bounded by the arms 5 and central bodies 4 of the link members 2. This open space 8 becomes filled with belt material during construction of the belt and, together with the plug of belt material in space 7, maintains the flexibility and strength of the belt.

Figure 8:
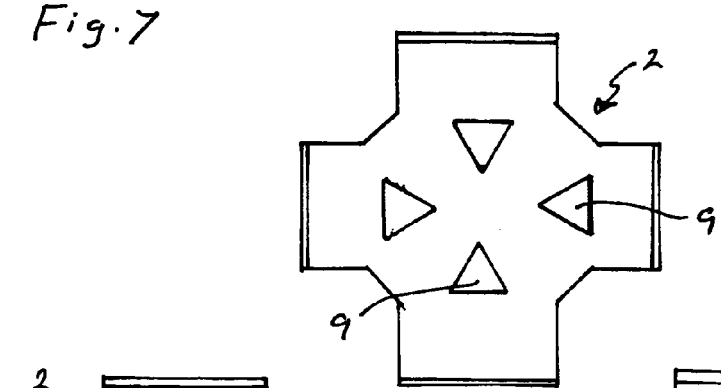
FIGS. 8-10 illustrate alternative embodiments of the link members with apertures on the central body.
Figure 9:
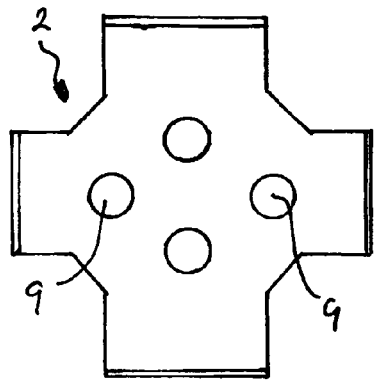
Figure 10:
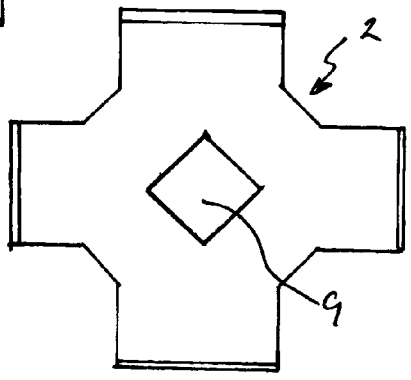

In addition to the space 7 and open space 8 formed between adjacent link members 2, the link members 2 themselves may be provided with apertures 9 of various size, shape and arrangement in the central body 4 as shown in FIGS. 8, 9 and 10. These apertures 9 permit the plies 1 of belt material to adhere through the body 4 of the link members 2 thereby adding to the overall strength and uniformity of the belt structure. Particularly where the plies 1 of belt material are laid up from uncured rubber and then cured to form a single mass of rubber the length and width of the belt, the apertures 9 together with the open spaces 8 and spaces 7 result in the link members becoming completely encased by and secured within the belt material.

In the preferred embodiment, illustrated in FIG. 1, the transport or conveyor belt of the present invention comprises a first rubber layer 10 having an upper surface 101 and a lower surface 102, a second rubber layer 11 having an upper surface 111 and a lower surface 112, a third rubber layer 12 having an upper surface 121 and a lower surface 122 where the third rubber layer 12 is disposed between the upper surface 101 of the first rubber layer 10 and the lower surface 112 of the second rubber layer 11, and a plurality of link members 2 providing a carcass 3, as described previously, where the ends 6 of the arms 5 are bent so as to be substantially perpendicular to the plane of the central body 4 for a length corresponding substantially to the thickness of the third rubber layer 12.

In this construction, the first rubber layer 10 is laid down and a first layer of the link members 2 is disposed in rows and columns on the upper surface 101 of the first rubber layer 10 with the ends 6 pointing upward away from the first rubber layer 10. This layer of link members 2 corresponds to the upward facing link members 2' of FIG. 7. Adjacent link members 2 are spaced apart a distance less than the distance to be spanned by opposing arms 6 of a subsequent second layer of link members 2. A template over the first rubber layer may be used to obtain the correct spacing of the link members 2 on the first rubber layer 10. Alternatively other registration means, such as lasers, electric eyes, or the like may be employed.

The third rubber layer 12 is disposed over the first layer of the link members 2 and pressed down onto the link members 2 so the ends 6 of the link members 2 pierce the third rubber layer 12 and the lower surface 122 of the third rubber layer 12 contacts both the link members 2 and the upper surface 101 of the first rubber layer 10 in the open spaces 8 between the link members 2. A second layer of the link members 2 is disposed in rows and columns on the upper surface 121 of the third rubber layer 12 with the ends 6 pointing downward toward the first rubber layer 10. This second layer of link members 2 corresponds to the downward facing link members 2" of FIG. 7. Adjacent link members 2 of the second layer are spaced apart a distance less than the distance spanned by opposing arms 6 of the link members 2 of the first layer and are disposed over the spaces between the link members 2 of the first layer so as to form the arrangement of FIG. 7. As with the first layer of link members 2, a template or other registration means, such as lasers, electric eyes, or the like may be employed to obtain correct placement of the second layer of link members 2 that is keyed to the first layer of link members 2.

The second layer of downwardly facing link members 2 is pressed down onto the upper surface 121 of the third rubber layer 12 so the ends 6 of the link members 2 of the second layer pierce the third rubber layer 12 so as to be located parallel to and inward of the ends 6 of the first layer of the link members 2 such that the third rubber layer 12 is confined between the first layer of the link members 2 and the second layer of the link members 2 as well as within the space 7 between parallel pairs of ends 6 of the first and second layers of the link members 2.

The second rubber layer 11 is laid over the third rubber layer 12 and the second layer of link members 2 whereby the lower surface 112 of the second rubber layer 11 contacts the second layer of the link members 2 and the upper surface 121 of the third rubber layer 12 in the open space 8 between the link members 2.

Preferably the first, second and third rubber layers, 10, 11 and 12, are unvulcanized such that the assembled laminate of three rubber layers and two link member layers described above can then be vulcanized using common methods and equipment employed in the manufacture of rubber conveyor or transport belts. The tackiness of unvulcanized rubber will help to hold the link members in place during assembly and vulcanization of the rubber layers will cause the individual layers to become a single monolithic body of rubber with the interengaging link members 2 embedded therein. In addition, the lower surface 102 of the first rubber layer 10 and the upper surface 111 of the second rubber layer can be textured using methods common to the manufacture of rubber conveyor or transport belts. Alternatively, additional outer layers of rubber or other flexible material can be secured to the lower surface 102 of the first rubber layer 10 and the upper surface 111 of the second rubber layer concurrently with or subsequent to vulcanization. The texture and/or material forming the outer surfaces of the final belt will depend on the use for which the belt is intended.

The link members 2 may be positioned so that the outer faces of the ends 6 of the outermost lateral arms 5 are flush with the outer edge of the belt thus providing partial protection to the belt edge. Also, a protective edge material may be applied to the finished belt as is know in the art. Alternatively, the link members 2 may be arranged so that all parts of the link members are completely embedded within the rubber of the belt. Also, for added edge strength, particularly in the case of any lateral bending of the belt, a cable may be incorporated running the length of the belt within the angle formed by the ends 6 with the outermost lateral arms 5.

Where materials other than unvulcanized rubber are used for the plies 1 of belt material, appropriate adhesives or cements are used to secure the plies 1 together at the open spaces as well as to secure the plies 1 to the link members. In addition, as above, the ends 6 of the layers of link members 2 will pierce the substance of the middle ply corresponding to the third rubber layer 12.

Depending on the particular belt material, the surfaces of the link members 2 are treated to promote secure adhesion to the belt material. Thus, where the link members 2 are metal and the belt material is rubber, the link members may be shot blasted, pickled, acid etched or otherwise abraded to provide a suitable surface for rubber to metal bonding. Clearly where the link members 2 and belting material are fabricated from other materials or where adhesives or cements are used, the surfaces of the link members 2 are preferably treated in appropriate manners to promote secure bonding of the link members and belt material.

It is an even further object of the present invention to provide a transport or conveyor belt of the above character having a splice means comprising a plurality of snap links and a cable cooperating therewith wherein the snap links comprise a plate portion adapted to overlie an arm of the link members and a box portion adapted to cooperate with the perpendicular ends of the arms, the box portion comprising at least one wall perpendicular to the plate portion and having an aperture therein to receive a binding cable, and where the snap links are positioned in cooperating exposed arrangement at the ends of the belt.

Since conveyor or transport belts run in a continuous loop, it is necessary to join the two ends together to form that loop. Alternatively, the desired belt length can be made up from shorter sections joined to whatever length is desired. In any event the present invention includes unique structures for joining belt ends or splicing sections of belt together.

A first such splice is shown in FIGS. 11-15 and comprises a simple bridge plate 13 having a width substantially the same as the width of the arms 5 of the link members 2 of the belt. The bridge plate 13 consists of an elongated body 14 with ends 15 bent so as to be perpendicular to the plane of the body 14. The length of the body 14 is slightly greater than the transverse width of the link Member 2 so as be able to span across an opposing pair of arms 5 and central body 4 of one link member 2. In addition, the length of the bent ends 15 is slightly greater than the length of the ends 6 of the link member to permit the body 14 of bridge plate 13 to be spaced from arms 5 and central body 4 of the link member 2 that it spans.

Figure 12:
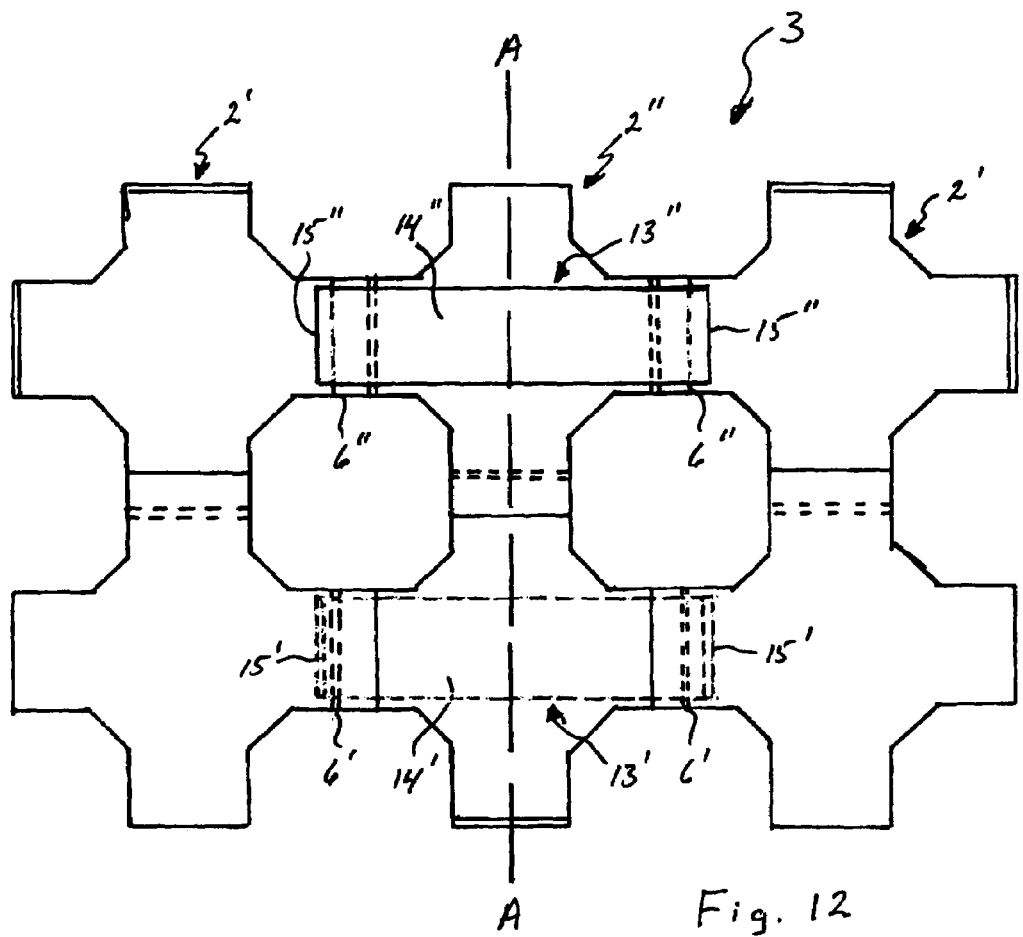
FIG. 12 illustrates a splice made using the splice member of FIG. 11.
Figure 11:
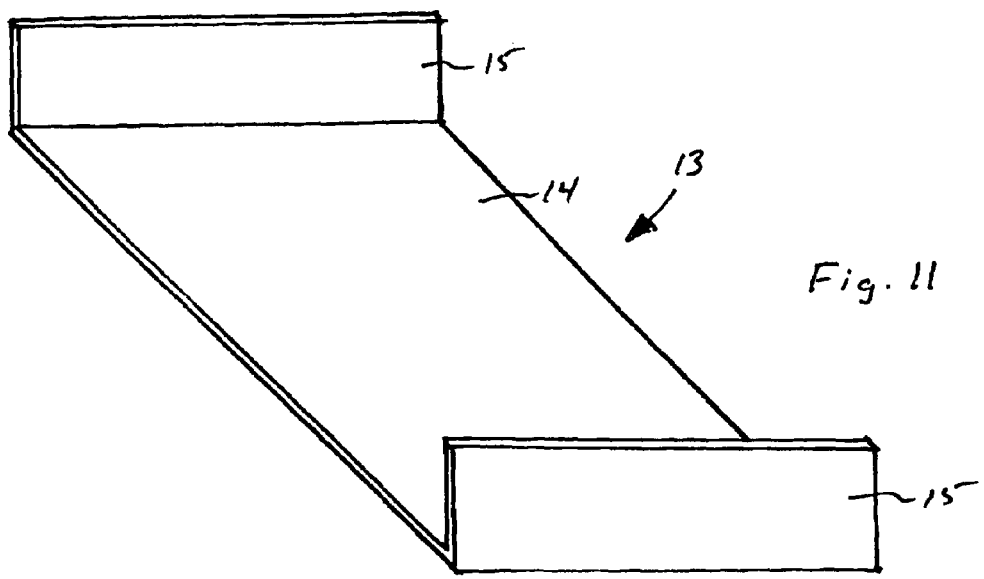
FIG. 11 illustrates a splice member useable with the belt of the present invention.
Figure 13:
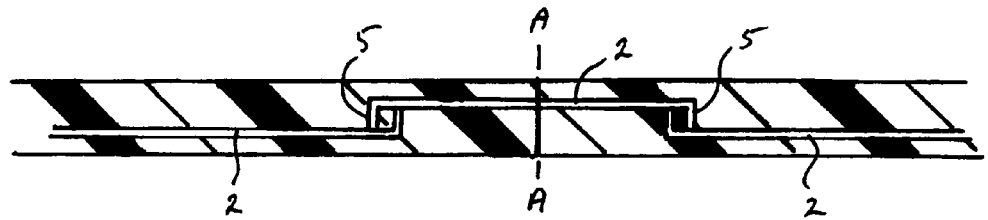
FIGS. 13-15 illustrate the steps of forming a splice in the belt using the splice member of FIG. 11.
Figure 14:
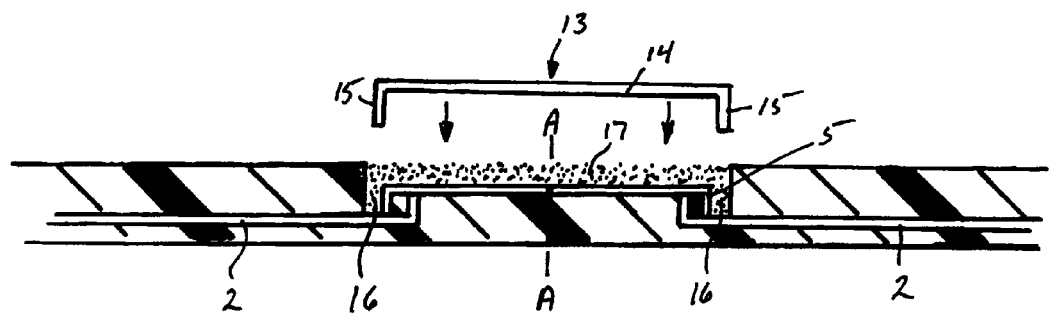
Figure 15:
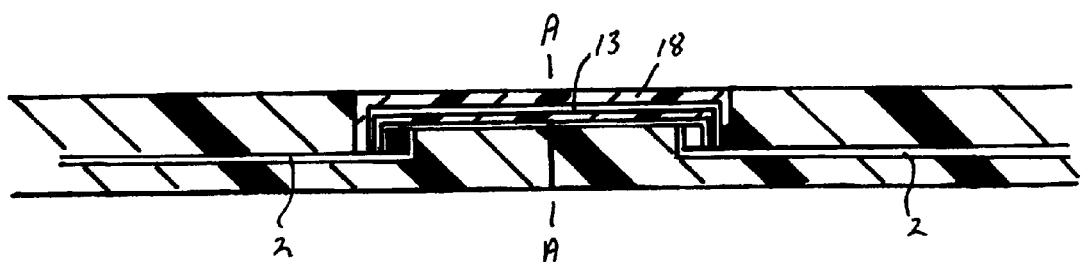

FIG. 12 illustrates the section of carcass 3 of FIG. 7 spliced using the bridge plate 13 and FIGS. 13-15 illustrate the steps of the splicing procedure.

In FIG. 12, the splice is made across line A-A with an upward facing bridge plate 13' in position on the underside of the carcass 3 spanning an upward facing link member 2' and a downward facing bridge plate 13" in position on the upper side of the carcass spanning a downward facing link member 2". In each case the length of the elongated body is sufficient to extend slightly beyond the ends 6' and 6" of the respective link members 2' and 2".

Turning to FIGS. 13-15, a belt according to the invention is provided comprising a carcass 3 of upward facing link members 2' and downward facing link members 2" embedded in vulcanized rubber belt material. The location of the splice is designated at A-A.

In performing the splice, the belt is cut across its width at line A-A by a cutting wheel or other appropriate tool cutting completely through the belt and the link members 2 as shown in FIG. 13. In this example, the splice is shown over a downward facing link member 2" and would be identical for an upward facing link member 2'.

In FIG. 14, after cutting the belt, the rubber belt material is ground out from the area above the link member 2 and in channels 16 on either side of the link member 2 to the depth of the adjacent interengaging link member 2. This is duplicated (but not shown) in the underside of the belt. In this manner, the link members 2 in the area of the splice are exposed together with the ends 6 of opposing arms 5. The ground out area and the channels 16 are filled with unvulcanized rubber 17 and the bridge plate 13 is inserted spanning the splice A-A and the link member 2, the ends 15 of bridge plate 13 being outside of the ends 6 of the link member 2 and the elongated body 14 of bridge plate 13 being spaced from the central body 4 of the link member 2. In this manner the unvulcanized rubber 17 fills the area between the link member 2 and the bridge plate 13 as well as the area above the bridge plate 13. The rubber 17 is then vulcanized by any suitable means to complete the splice embedding the bridge plate 13 and rejoining the separated belt ends with new rubber 18 as shown in FIG. 15. This splice structure and method is particularly suitable for in the field repairs using a portable vulcanization apparatus.

Belt ends or preformed sections of belt can also be joined to form a completed belt by providing the belt ends with exposed link ends 6 and cooperating snap links 19 formed from the same materials as the belt and designed to cooperate with the interengaged ends of the belt or belt section and a cable or pin 20 as a securing means or hinge member.

Figure 18:
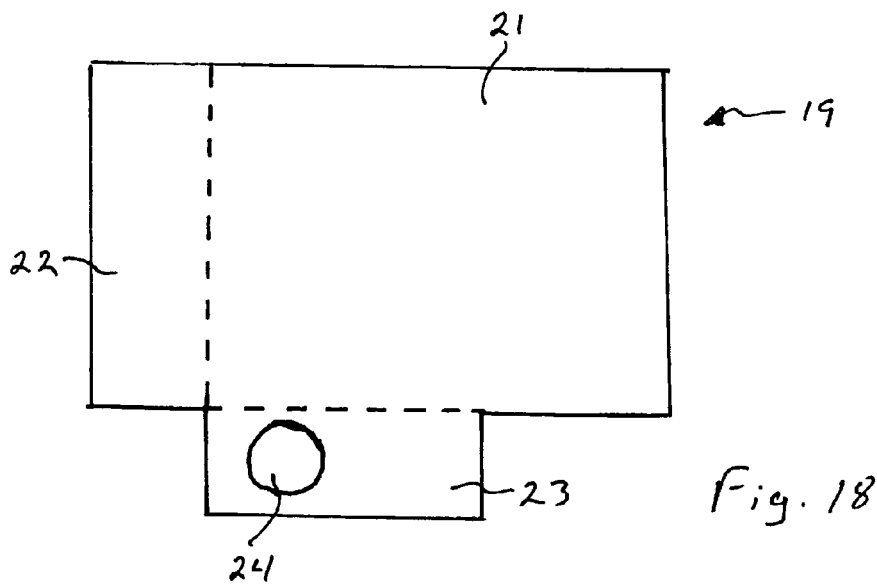
FIG. 18 illustrates the plate blank of the snap splice of FIGS. 16 and 17.
Figure 17:
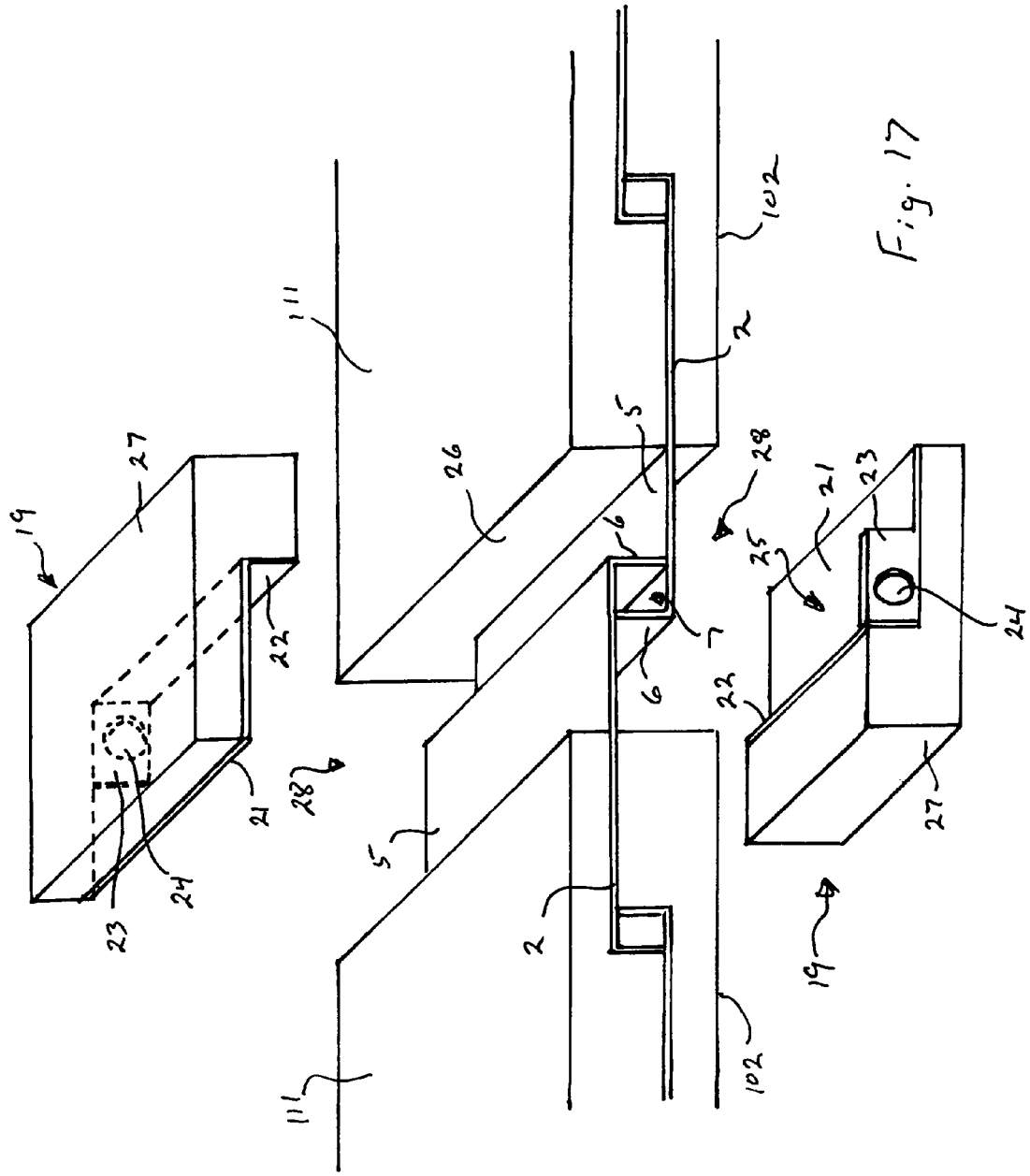
FIG. 17 is a detail of the snap splice of FIG. 16.

The snap link 19 is shown in FIG. 17 and comprises a plate 21, an end tab 22 and a side tab 23, as seen in FIG. 18. The side tab 23 is provided with an aperture 24 which will receive the cable or pin 20. Plate 21 is preferably made from the same material used to form the link members 2 of the belt 1. The snap link 19 is formed by bending the end tab 22 and side tab 23 in the same direction so as to be perpendicular to the plane of the plate 21 forming a two sided box-like structure 25 at the end of the plate 21. This box-like structure 25 is provided with a rubber coating 27 over the outer surfaces of the plate 21 and end tab 22. This rubber coating 27 is preferably the same rubber composition as that of the belt 1 and is securely bonded to the box-like structure 25 to form the snap link 19. In order to accommodate the upward and downward facing link members 2, the snap link 19 is provided in left and right hand versions which are mirror images as can be seen in FIG. 17.

One version of the snap link 19 is used with the downward facing link members 2 and the other version of the snap link is used with the upward facing link members 2. Either version may be used in the upward or downward position, but in order for the ends of the belt to come together, all of the snap links 19 on one end must be one version and all of the snap links on the other end must be the other version. In the present description the right hand snap links 19 will be downward facing and the left hand snap links 19 will be upward facing.

Figure 16:
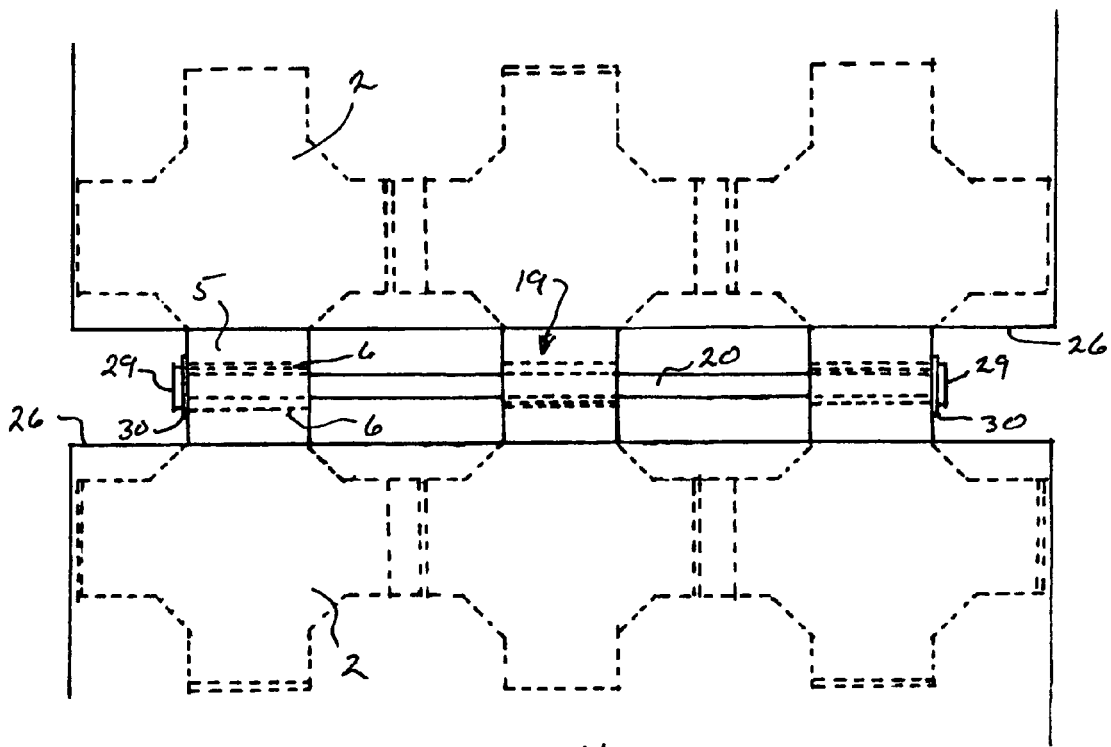
FIG. 16 illustrates a joining of free ends of the belt using a snap splice according to the invention.

FIG. 16 illustrates a section or end joint made with the snap links 19.

In manufacturing the belt or belt sections, the ends of the belt or belt section are provided with arms 5 and ends 6 of the last row of each layer of link members 2 exposed. Thus, as shown in FIG. 17, the belt material ends at 26 and one arm 5 of each link member 2 extends outward therefrom and is exposed. The exposed arms 5 of each belt end alternate in opposite relationship so that when the belt ends are brought together for joining with the snap splice 19, the exposed perpendicular ends interengage in the same manner as within the belt carcass with space 7 created between the interengaged perpendicular ends 6. With the belt ends interengaged as shown in FIG. 17, there is an open space 28 above and below the exposed arms 5 and ends 6 between the belt material ends 26. Into these spaces are positioned right and left hand snap links 19, the side tabs 23 of each snap link being positioned over the opposite outer ends of space 7 thereby forming an enclosed channel through which a cable or pin 20 will pass to complete the splice. The rubber coating 27 of each snap splice 19 is dimensioned to substantially fill the space 28 between the belt material ends 26 on each side of the splice so that the outer surface of each snap splice 19 is substantially coextensive with the upper surface 111 or lower surface 102 of the belt. With the snap splices 19 in place, a cable or pin 20 is passed through the aligned apertures 24 and spaces 7 and a nut, cross or cotter pin 29 is applied at each end to maintain the cable or pin 20 in place and prevent separation of the joint. If desired, a washer 30 may be placed between the nut or cotter pin 29 and side tabs 23 at each end of the rod or cable 20. The adjacent faces of rubber coating 27 and belt material ends 26 or arms 5 may be adhered together by cement, adhesive or vulcanization or left unadhered.

The unique construction of the belt of the present invention combines the strength of metals with the tough flexibility and wear resistance of rubbers to provide belts for general conveyor use, mining, aggregate and ore services, quarry use, high temperature and foundry use, timber use, as well as other uses. Made from steel, brass, etc., with true rubber-to-metal bonding, the carcass links interlock to give the strength of metal. The links can be supplied in almost any metal and thickness for belt strengths of 4800 pounds per inch of belt width and beyond. The rubber materials are chosen to suit the material being conveyed and in any practical thickness.

These belts are easily manufactured, from materials which are readily available and inexpensive and by common layered belt manufacturing means such as adhesive joining or vulcanization. In addition, the metal of the link members and their design provide edge reinforcement along the belt without the need for additional longitudinal reinforcements or wear resisting covers required by other belts but do not restrict the use of such other reinforcements or covers.

The present invention also provides a unique structure for joining belt ends and splicing sections of the belt together permitting a long belt to be assembled from shorter sections while maintaining the strength and flexibility of the belt structure. This facilitates repair of the belt in the field with reduced down time for the user.

While the invention has been described with respect to certain specific embodiments, it will be appreciated that many modifications and changes may be made by those skilled in the art without departing from the spirit of the invention. It is intended, therefore, that all such modifications and changes are within the true spirit and scope of the invention as recited in the following claims.

What is claimed is:

1. A transport belt comprising:
   a plurality of plies of flexible material adhered together, and
   an interposed carcass comprising a plurality of interengaging links embedded within said flexible material wherein said links each comprise a substantially planar, cross shaped member having a central body and two pairs of opposing arms disposed across said flexible material in an alternating and partially overlapping arrangement with the ends of said arms being disposed perpendicular to the plane of said central body.

2. The transport belt of claim 1 further comprising each of said ends being disposed perpendicular to said central body in the same direction.

3. The transport belt of claim 2 further comprising adjacent links inverted relative to each other and disposed in lateral and longitudinal rows across and along said transport belt and embedded within said transport belt, whereby the ends of said arms of one link extend in a direction opposite to the ends of said arms of adjacent links and whereby said arms of adjacent links overlap whereby the ends of said arms of one link are disposed laterally toward the centers of said adjacent links providing a space between the ends of adjacent interengaging links whereby said flexible material is disposed between said adjacent ends.

4. The transport belt of claim 3 wherein said flexible material comprises vulcanized and unvulcanized rubber.

5. The transport belt of claim 4 wherein said links are metal.

6. The transport belt of claim 5 further comprising apertures within the central body of said links.

7. A transport belt for a conveyor comprising:
   a first rubber layer having an upper surface and a lower surface,
   a second rubber layer having an upper surface and a lower surface,
   a third rubber layer having an upper surface and a lower surface and disposed between said upper surface of said first rubber layer and said lower surface of said second rubber layer,
   a plurality of link members each comprising a substantially planar cross-shaped member having a central body and two pairs of opposing arms, the ends of said arms being bent so as to be substantially perpendicular to the plane of said central body for a length corresponding substantially to the thickness of said third rubber layer,
   wherein a first layer of said link members is disposed in rows and columns on said upper surface of said first rubber layer with said ends of said arms pointing upward away from said first rubber layer, adjacent link members being spaced apart a distance less than the distance spanned by opposing arms of said link members,
   said third rubber layer is disposed over said first layer of said link members whereby said ends of said arms pierce said third rubber layer and said lower surface of said third rubber layer contacts said upper surface of said first rubber layer between said link members, a second layer of said link members is disposed in rows and columns on said upper surface of said third rubber layer with said ends of said arms pointing downward toward said first rubber layer, adjacent link members of said second layer being spaced apart a distance less than the distance spanned by opposing arms of said link members and said link members of said second layer being disposed over spaces between said link members of said first layer whereby said ends of said arms of said second layer pierce said third rubber layer so as to be located parallel to and inward of said ends of said arms of first layer of said link members whereby said third rubber layer is confined between said first layer of said link members and said second layer of said link members, and said second rubber layer is disposed over said third rubber layer and said second layer of link members whereby said lower surface of said second rubber layer contacts said second layer of said link member and said upper surface of said third rubber layer between said link members, whereby said first, second and third rubber layers are adhered together forming a unitized belt body with said interengaging link members confined therein.

8. The transport belt of claim 7 wherein said first, second and third rubber layers are adhered by adhesive means.

9. The transport belt of claim 7 wherein said first, second and third rubber layers are adhered by vulcanization.

10. The transport belt of claim 7 further comprising apertures in said central bodies of said link members whereby first and second rubber layers contact said third rubber layer through said link members.

11. The transport belt of claim 7 further comprising a splice means whereby ends of said transport belt are joined.

12. The transport belt of claim 11 wherein said splice means comprises a substantially planar elongated plate member having perpendicular ends and adapted to span a pair of opposing arms of a link member.

13. The transport belt of claim 11 wherein said splice means comprises a plurality of snap links and a hinge member cooperating therewith wherein said snap links comprises a plate portion adapted to overlie an exposed arm of said link members and box portion adapted to cooperate with said perpendicular ends of said exposed arms, said box portion comprising at least one wall perpendicular to said plate portion and having an aperture therein to receive said hinge member.

14. The transport belt of claim 7 wherein said opposing pairs of arms are of equal length.

15. The transport belt of claim 7 further comprising free ends of said belt having perpendicular ends of said link members exposed with at least a portion of associated arms thereof and a plurality of snap links cooperating with said exposed perpendicular ends and arms, said snap links comprising a plate portion adapted to overlie said arm of said exposed perpendicular ends and a box portion disposed adjacent said exposed perpendicular ends, said box portion comprising an end wall disposed against said perpendicular end and a side wall at right angles to said perpendicular end, said side wall having an aperture therein to receive a securing means, whereby placing said snap links over interengaged perpendicular ends of said free ends of said belt brings said apertures into alignment on either side of a channel formed between said interengaged perpendicular ends whereby passage of a securing means therethrough secures said free ends of said belt together in the manner of a hinge.

16. The transport belt of claim 15 wherein said snap links further comprise a rubber coating over outer surfaces of said plate portion and said box portion, said rubber coating being bonded to said snap links and of a dimension to fill a space between said belt ends over said interengaged free ends of said belt.

17. The transport belt of claim 16 wherein said securing means comprises a cable.

18. The transport belt of claim 16 wherein said securing means comprises a hinge pin.

\* \* \* \* \*